C. K. MARSHALL.
Jack-Screw.
No. 161,974.    Patented April 13, 1875.
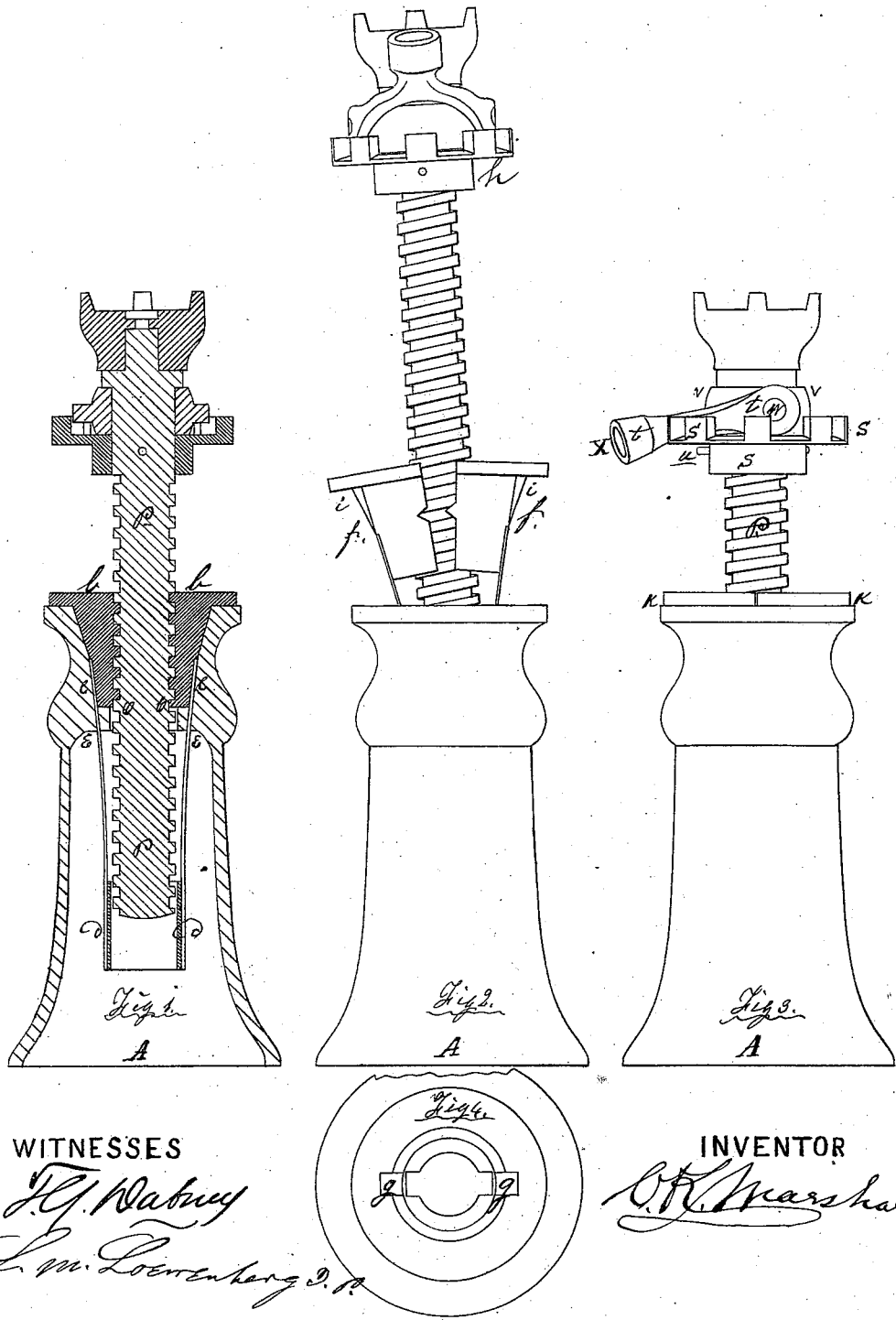
WITNESSES    INVENTOR

UNITED STATES PATENT OFFICE.

CHARLES K. MARSHALL, OF VICKSBURG, MISSISSIPPI.

IMPROVEMENT IN JACK-SCREWS.

Specification forming part of Letters Patent No. 161,974, dated April 13, 1875; application filed September 17, 1874.

*To all whom it may concern:*

Be it known that I, CHARLES K. MARSHALL, of Vicksburg, Mississippi, have invented a Jack-Screw, of which the following is a specification:

My invention consists of an open nut applied to the general construction of jack-screws. I make a nut in two or more parts, and, by opening the nut, I save the turning of the screws backward, and thereby save a large amount of valuable time.

In the annexed drawing, A A A is the barrel of the jack-screw in Figures 1, 2, and 3. A chamber is made in the top of the barrel, into which the halves of the nut are placed, as at $b\ b$. To each of these pieces of the nut is riveted a spring-guide; and these springs reach down into the barrel, and the lower ends are riveted to an iron ring, the length of which may be one and a half or two inches, and encircling the screw, as seen at $c\ c$ and $d\ d$, Fig. 1. The parts of the nut are kept together by the ring at $d\ d$ and cannot be lost, as, after they are riveted to the springs and the springs to the ring, the ring always strikes against a shoulder that constitutes the base of the chamber which holds the nut-halves, as at $e\ e$. When the screw has been turned up to the required height and must be dropped down to take a fresh action, it is merely raised, as seen in Fig. 2, and the halves of the nut come out of the chamber, as seen at $f\ f$. The springs throw the halves of the nut back from the screw, so that it may be dropped down readily without raking the thread of the screw. The springs fall off from the screw, dropping into the slots seen in Fig. 4, at $g\ g$; and when the screw is dropped down to or near the shoulder $h$, Fig. 2, the halves of the nut are closed onto the screw, and they slide down into the chamber. At $i\ i$, Fig. 2, are seen two lugs, that fill the spaces $g\ g$, Fig. 4, which prevents the nut from turning round in the chamber. In Fig. 3 the flange of the sectional nut is seen at K K, and it takes part of the pressure, while part of it is taken by the lower end of the nut, on the base of the chamber, at $o\ o$ in Fig. 1. In Fig. 3 the screw shows, near its top, a ratchet, $s\ s$, with teeth standing perpendicularly, and separated sufficiently to allow the lever $t\ t$ to drop between them and turn the screw. The ratchet is fastened to the body of the screw by a pin at $u$. The lever is fastened to the ring $v\ v$, which revolves round the shaft of the screw, and, having lugs, as $w$, holds part of the lever always convenient for work, and a long lever may be inserted and removed at pleasure. Otherwise, the moving apparatus of the screw is like those in ordinary use.

I claim—

1. In the lifting-jack, a divided or sectional nut, $f\ f$, Fig. 2, attached by elastic connections to the cylinder $d\ d$, Fig. 1.

2. The combination of the divided nut, shown also at $b\ b$, Fig. 1, springs $c\ c$ and $d\ d$, and screw P P, Fig. 1.

3. The ratchet $s$, in combination with the lever-head $t$, having a yoke to fit the trunnions $w$ upon the shaft of the screw, or its equivalent, Fig. 3.

4. The combination of the nut $f\ f$, Fig. 2, screw P, ratchet $s$, lever $t$, and barrel A, substantially as described, and for the purposes set forth.

C. K. MARSHALL.

Witnesses:
 JOSEPH GENELLA,
 G. L. RECERD.